(12) United States Patent
Mayer et al.

(10) Patent No.: US 9,614,557 B1
(45) Date of Patent: Apr. 4, 2017

(54) APPARATUS AND METHODS FOR PHASE SYNCHRONIZATION OF LOCAL OSCILLATORS IN A TRANSCEIVER

(71) Applicant: Analog Devices, Inc., Norwood, MA (US)

(72) Inventors: Christopher Mayer, Dover, MA (US);
David J. McLaurin, Raleigh, NC (US);
Chris Angell, Cary, NC (US)

(73) Assignee: ANALOG DEVICES, INC., Norwood, MA (US)

( * ) Notice: Subject to any disclaimer, the term of this patent is extended or adjusted under 35 U.S.C. 154(b) by 0 days.

(21) Appl. No.: 14/954,857

(22) Filed: Nov. 30, 2015

(51) Int. Cl.
*H04B 1/38* (2015.01)
*H04L 5/16* (2006.01)
*H04B 1/04* (2006.01)
*H04L 1/00* (2006.01)
*H04B 17/13* (2015.01)

(52) U.S. Cl.
CPC ........... *H04B 1/0475* (2013.01); *H04B 17/13* (2015.01); *H04L 1/0042* (2013.01)

(58) Field of Classification Search
CPC ..... H04L 1/243; H04L 1/0001; H04L 1/0009; H04L 1/1854; G01R 31/31716
USPC .................................. 375/219–236, 295–297
See application file for complete search history.

(56) References Cited

U.S. PATENT DOCUMENTS

| 5,825,813 | A * | 10/1998 | Na | H03D 7/163 331/18 |
|---|---|---|---|---|
| 6,456,164 | B1 | 9/2002 | Fan | |
| 6,463,266 | B1 * | 10/2002 | Shohara | H03J 7/04 375/219 |
| 6,516,184 | B1 * | 2/2003 | Damgaard | H04B 1/406 375/295 |
| 6,556,086 | B2 | 4/2003 | Keaveney et al. | |
| 6,845,126 | B2 * | 1/2005 | Dent | H03F 3/24 375/219 |
| 7,155,180 | B2 * | 12/2006 | Kim | H03C 3/403 455/114.2 |
| 7,317,360 | B2 | 1/2008 | Keaveney | |
| 7,319,724 | B2 * | 1/2008 | Kishi | H04B 17/14 375/296 |
| 7,362,826 | B2 * | 4/2008 | Willingham | H04B 17/21 331/10 |
| 7,398,056 | B1 * | 7/2008 | Ebert | H04B 17/0085 455/42 |
| 7,463,710 | B2 | 12/2008 | Walsh et al. | |
| 7,466,785 | B2 * | 12/2008 | Sanduleanu | H03L 7/087 375/371 |
| 7,606,341 | B2 * | 10/2009 | Pereira | H04L 7/0337 375/224 |
| 7,672,364 | B2 * | 3/2010 | Kang | H04B 17/21 375/219 |

(Continued)

*Primary Examiner* — James M Perez
(74) *Attorney, Agent, or Firm* — Knobbe Martens Olson & Bear LLP (57) ABSTRACT

A method and apparatus for phase adjustment of a RF transceiver is disclosed. Based on a first local oscillator signal and a second local oscillator signal, a beat signal that indicates the frequency and phase relationship between the first and second local oscillator signals can be generated. Using the beat signal, changing phase relationship between the first and second local oscillator signals can be cumulatively taken account for using phase averaging to allow quick restoration to observation of a previously observed channel.

21 Claims, 4 Drawing Sheets

(56) References Cited

U.S. PATENT DOCUMENTS

| | | | | |
|---|---|---|---|---|
| 7,733,949 B2* | 6/2010 | Jin | H04B 17/354 | 375/221 |
| 7,734,000 B2* | 6/2010 | Kuo | H03L 7/087 | 375/360 |
| 7,804,926 B2* | 9/2010 | Sanduleanu | H03D 13/003 | 327/157 |
| 7,826,808 B2* | 11/2010 | Faulkner | H04B 1/525 | 455/114.1 |
| 7,986,745 B2* | 7/2011 | Hosaka | H03M 5/16 | 341/58 |
| 8,106,690 B2* | 1/2012 | Sakaguchi | H03L 7/23 | 327/147 |
| 8,121,233 B2* | 2/2012 | Chang | H03L 7/00 | 375/226 |
| 8,284,824 B1* | 10/2012 | Smaini | H04B 1/40 | 341/118 |
| 8,340,167 B2* | 12/2012 | Feng | H04B 17/21 | 375/226 |
| 8,358,729 B2* | 1/2013 | Bae | H03L 7/0891 | 327/155 |
| 8,665,938 B2* | 3/2014 | Yu | H04W 24/10 | 375/220 |
| 8,816,724 B2 | 8/2014 | Kennedy | | |
| 8,897,735 B2* | 11/2014 | Kim | H04B 1/525 | 375/148 |
| 8,917,759 B2* | 12/2014 | Xu | H04L 27/2272 | 375/214 |
| 8,958,504 B2* | 2/2015 | Warke | H04L 27/0014 | 375/235 |
| 8,995,517 B2* | 3/2015 | Delforce | H04B 17/0085 | 375/220 |
| 9,008,161 B1* | 4/2015 | Chang | H04L 25/03261 | 375/219 |
| 9,048,847 B2 | 6/2015 | McLaurin et al. | | |
| 9,203,448 B2* | 12/2015 | Morita | H04B 1/0475 | |
| 9,300,444 B2* | 3/2016 | Hormis | H04L 1/243 | |
| 9,325,553 B2* | 4/2016 | Kaukovuori | H04B 1/0057 | |
| 9,385,790 B1* | 7/2016 | Mukherjee | H04B 5/0087 | |
| 2003/0151455 A1* | 8/2003 | Kawai | H03J 7/02 | 329/300 |
| 2003/0153273 A1* | 8/2003 | Ebert | H04L 1/0001 | 455/67.14 |
| 2003/0171110 A1* | 9/2003 | Shi | H04B 1/406 | 455/324 |
| 2003/0206603 A1* | 11/2003 | Husted | H04L 27/3872 | 375/324 |
| 2006/0034356 A1* | 2/2006 | Fechtel | H03D 3/008 | 375/219 |
| 2006/0035601 A1* | 2/2006 | Seo | H04B 1/40 | 455/78 |
| 2007/0077906 A1* | 4/2007 | Kirichenko | H03D 7/005 | 455/323 |
| 2008/0008067 A1* | 1/2008 | Arisaka | G11B 20/10009 | 369/47.27 |
| 2009/0054007 A1 | 2/2009 | Kawabe et al. | | |
| 2009/0146736 A1* | 6/2009 | Kim | H03F 1/3247 | 330/149 |
| 2009/0232195 A1* | 9/2009 | Ozawa | H03L 7/091 | 375/232 |
| 2010/0087227 A1* | 4/2010 | Francos | H03F 1/3247 | 455/562.1 |
| 2010/0150289 A1* | 6/2010 | Sunaga | H04L 25/4906 | 375/371 |
| 2011/0013724 A1* | 1/2011 | Metreaud | H04L 27/0014 | 375/296 |
| 2012/0230176 A1* | 9/2012 | Komninakis | H04B 1/525 | 370/201 |
| 2012/0300818 A1* | 11/2012 | Metreaud | H04B 1/30 | 375/219 |
| 2013/0266045 A1* | 10/2013 | Lakkis | H04B 1/30 | 375/219 |
| 2014/0134943 A1* | 5/2014 | Hobbs | H04B 7/15535 | 455/9 |
| 2014/0192923 A1* | 7/2014 | Matsuo | H01Q 3/2605 | 375/296 |
| 2015/0222418 A1* | 8/2015 | Akita | H03L 7/087 | 375/355 |
| 2016/0036451 A1* | 2/2016 | Kamali | H03L 7/08 | 29/593 |
| 2016/0043860 A1* | 2/2016 | Tu | H03L 7/087 | 375/371 |
| 2016/0087783 A1* | 3/2016 | Lin | H04L 27/00 | 375/219 |
| 2016/0087784 A1* | 3/2016 | Lin | H04B 1/40 | 375/219 |

\* cited by examiner

APPARATUS AND METHODS FOR PHASE SYNCHRONIZATION OF LOCAL OSCILLATORS IN A TRANSCEIVER

CROSS-REFERENCE TO RELATED APPLICATIONS

This application is related to U.S. application Ser. No. 14/952,706, filed on Nov. 25, 2015, and titled "APPARATUS AND METHODS FOR TRANSCEIVER CALIBRATION," the disclosure of which is hereby incorporated by reference in its entirety herein.

BACKGROUND

Field

Embodiments of the invention relate to electronic systems, and more particularly, to transceiver calibration.

Description of the Related Art

A transceiver can be used in a wide variety of radio frequency (RF) communication systems. For example, transceivers can be included in mobile devices to transmit and receive signals associated with a wide variety of communications standards, including, for example, cellular and/or wireless local area network (WLAN) standards.

A transmit channel of an RF communication system can be calibrated to compensate for transmit impairments. Calibrating a transmit channel can enhance an RF communication system's performance, including, for example, by decreasing error vector magnitude (EVM) or meeting out of band emissions specifications.

SUMMARY

The methods and devices of the described technology each have several aspects, no single one of which is solely responsible for its desirable attributes.

In one aspect, a method of transceiver calibration includes generating a transmit local oscillator signal of a first frequency, generating an observation local oscillator signal of a second frequency different from the first frequency, generating a beat signal based on the transmit local oscillator signal and the observation local oscillator signal, and generating a phase adjustment value based on the beat signal, wherein the phase adjustment value indicates a phase relationship between the transmit local oscillator signal and the observation local oscillator signal.

In another aspect, a transceiver includes a transmit channel including a transmit local oscillator configured to generate a transmit local oscillator signal of a first frequency, an observation channel including an observation local oscillator configured to generate an observation local oscillator signal of a second frequency different from the first frequency, and a phase adjustment circuit configured to generate a beat signal based on the transmit local oscillator signal and the observation local oscillator signal, wherein the phase adjustment circuit is further configured to generate a phase adjustment value based on the beat signal, wherein the phase adjustment value indicates a phase relationship between the transmit local oscillator signal and the observation local oscillator signal.

BRIEF DESCRIPTION OF THE DRAWINGS

These drawings and the associated description herein are provided to illustrate specific embodiments of the described technology and are not intended to be limiting.

DETAILED DESCRIPTION

Various aspects of the novel systems, apparatuses, and methods are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass apparatus and/or methods which are practiced using structure and/or functionality in addition to or different than the various aspects set forth herein. It should be understood that any aspect disclosed herein might be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wired and wireless technologies, system configurations, networks, including optical networks, hard disks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

A radio frequency (RF) communication system, such as a direct conversion quadrature radio, can suffer from a variety of impairments. Absent calibration, the impairments can lead to transmit errors and/or performance degradation.

For example, a direct conversion quadrature radio can be used to process in-phase (I) and quadrature-phase (Q) signals, which ideally have a phase separation of 90°. However, one or more components of the direct conversion quadrature radio can have quadrature error. For example, a local oscillator can have a quadrature error that can be symmetric with respect to frequencies above and below the local oscillator's frequency. Moreover, mixers used for up-shifting the frequency spectrum of signals for transmission and/or mixers used for down-shifting signals for observation can likewise have quadrature error.

An RF communication system can also suffer from other transmit impairments, including, for example, those associated with local oscillator leakage. Absent calibration, the transmit impairments can degrade the RF communication system's performance, including, for example, by increasing EVM and/or degrading image rejection ratio (IRR).

To calibrate a transmit channel in an RF communication system, a portion of an RF transmit signal can be looped back into an observation channel. Additionally, the observation channel can be used to measure or observe the transmit channel's impairments, and correction can be applied based on the observations. Although calibrating a transmit channel in this manner can reduce transmit impairments, a transmit channel can nevertheless still suffer from transmit impairments after such a calibration. For example, impairments arising from a transmit mixer and an observation mixer often have similar spectral characteristics, and thus it is difficult to isolate such impairments from one another. Thus, calibrating a transmit channel based on observations from an observation channel can be limited by the impairments of the observation channel and therefore can be imperfect and may fail to correct for certain impairments in the transmit channel.

One technique for isolating transmit mixer impairments from observation mixer impairments is to first calibrate the observation channel before calibrating the transmit channel. For example, a continuous wave (CW) tone can be injected into the observation channel and used to calibrate the observation channel's observation mixer. After compensating the observation channel, the transmit RF signal can be looped into the observation channel to detect impairments arising from the transmit mixer. Although calibrating a transmit channel in this manner can correct for transmit mixer impairments, such a calibration scheme can suffer from complexity, high power consumption, and/or long calibration times.

In certain configurations, a transceiver includes a transmit channel or path and an observation channel or path. The transmit channel includes a transmit mixer that up-converts a transmit signal by a first or transmit local oscillator frequency. The observation channel includes an observation mixer that down-converts an observed signal from the transmit channel by a second or observation local oscillator frequency that is offset from the first local oscillator frequency. By observing the transmit channel using a local oscillator frequency that is offset relative to the transmit channel's local oscillator frequency, the observation channel can observe transmit channel impairments substantially independently from observation channel impairments.

Thus, the transmit channel can be properly calibrated based on observations taken using an observation channel without needing to calibrate the observation channel beforehand. In contrast, an RF communication system that uses the same local oscillator frequency for up-shifting in the transmit channel and down-shifting in the observation channel may not properly calibrate transmit impairments. For example, when using the same local oscillator frequency, both transmit local oscillator leakage and observation local oscillator leakage can have identical characteristics in the frequency domain.

In certain implementations, the transceiver further includes a digital modulator in the data path of the observation channel. The digital modulator is used to compensate for a frequency difference between transmit and observation local oscillator frequencies. After digitally-compensating for the frequency difference using the digital modulator, the transmit channel impairments should be symmetric, while the observation channel impairments should be shifted such that they are asymmetric. After frequency domain conversion and correlation of the digital modulator's output, the transmit impairments should be correlated and detectable, while the observation channel impairments should tend to be non-correlated and average as noise.

In certain implementations, the digital modulator includes a numerically controlled oscillator (NCO) and a digital complex mixer. Additionally, the NCO is programmed to generate a digital output clock signal, such a digital representation of a continuous wave tone, having a frequency that is about equal to a difference between the local oscillator frequency of the transmit channel and the local oscillator frequency of the observation channel.

When the frequency of the NCO's output clock signal is about equal to the frequency difference between the transmit channel and the observation channel, a correlation to detect transmit impairments can be made over a wide range of time periods. Thus, a tradeoff between the noise floor and the calibration time of the transmit channel can be controlled by selecting the time period over which the correlation is made. For example, the noise floor can be selectively lowered by choosing the time period to be relatively long.

Depending on the transmit impairment being detected and corrected, more or fewer samples can be collected and averaged to observe the impairment above the noise floor. For example, the more samples that are collected by an observation channel, the more the noise floor decreases. Accordingly, to detect relatively small impairments such as local oscillator leakage, a relatively large number of samples can be collected.

To correct transmit impairments based on observations using an observation channel, a channel mapping can be constructed for mapping the corrections applied to the transmit channel to the effects observed on the observation path. The channel mapping serves as a model for applying corrections to the transmit channel based on the observed impairments.

An observation local oscillator can be implemented using a phase-locked loop (PLL). During operation of a transceiver, the observation local oscillator can be used for a wide variety of purposes, and thus the PLL can be regularly reprogrammed to generate an observation local oscillator signal of a desired frequency. For instance, the PLL can be programmed to observe transmit channel impairments, reprogrammed to observe adjacent spectrum, and then reprogrammed to again observe transmit channel impairments. When the observation path local oscillator frequency is restored to a frequency suitable for observing transmit impairments, the PLL can relock with the same frequency, but with a different phase. The phase difference leads to a change in the phase relationship between the transmit local oscillator and observation local oscillator, and a corresponding change in the channel mapping.

When an observation local oscillator is reprogrammed, the channel mapping phase can change and be reacquired over time. However, when the acquisition time of the channel mapping phase is greater than the rate at which the observation local oscillator is reprogrammed, then the accuracy of transmit impairment correction via the channel mapping can be degraded.

Apparatus and methods for phase synchronization of local oscillators in a transceiver are provided herein. In certain configurations, a transceiver includes a transmit local oscillator that generates a transmit local oscillator signal, an observation local oscillator that generates an observation local oscillator signal, and a phase adjustment circuit that generates a beat signal based on the transmit and observation local oscillator signals. The phase adjustment circuit uses the beat signal to generate a phase adjustment value for correcting for a phase difference between the transmit and observation local oscillator signals, thereby restoring the phase relationship between the local oscillators after arbitrary frequency reprogramming.

Accordingly, in certain implementations, a beat signal indicating the frequency and phase relationship between the transmit and observation local oscillator signals is generated. The beat signal is used to generate a phase adjustment value for compensating for a phase shift between the transmit and observation local oscillator signals after the observation local oscillator is reprogrammed. Thus, a change in the phase relationship between the transmit and observation local oscillator signals can be accounted for.

In certain configurations, a digital modulator is included in the observation channel, and is used to compensate for a frequency difference between the transmit and observation local oscillator frequencies. Additionally, a phase shift between the transmit local oscillator signal and the observation local oscillator signal is compensated by a phase shift in the digital modulator. For example, the phase adjustment circuit can use the phase adjustment value to correct the phase of the digital modulator's phase accumulator, thereby compensating the resulting samples generated by the observation channel for the phase shift between the local oscillators.

In certain implementations, the beat signal is digitally sampled, and the state of the phase accumulator is sampled and averaged at beat signal transitions. For example, the beat signal can be sampled using a baseband clock signal, and the sampled beat signal can be provided to an edge detector. When a beat signal edge is detected (for instance, a rising edge), the current phase of phase accumulator can be accumulated into a phase averaging circuit. The phase averaging circuit can generate the phase adjustment value based on averaging the phase accumulator's phase over N samples, and the phase accumulator can be corrected with the phase adjustment value in a single cycle. After the adjustment to the phase accumulator's phase, the resulting output signal of the observation channel exhibits a substantially fixed relationship to the phase of the transmit data, thereby achieving phase synchronization.

Figure 1:
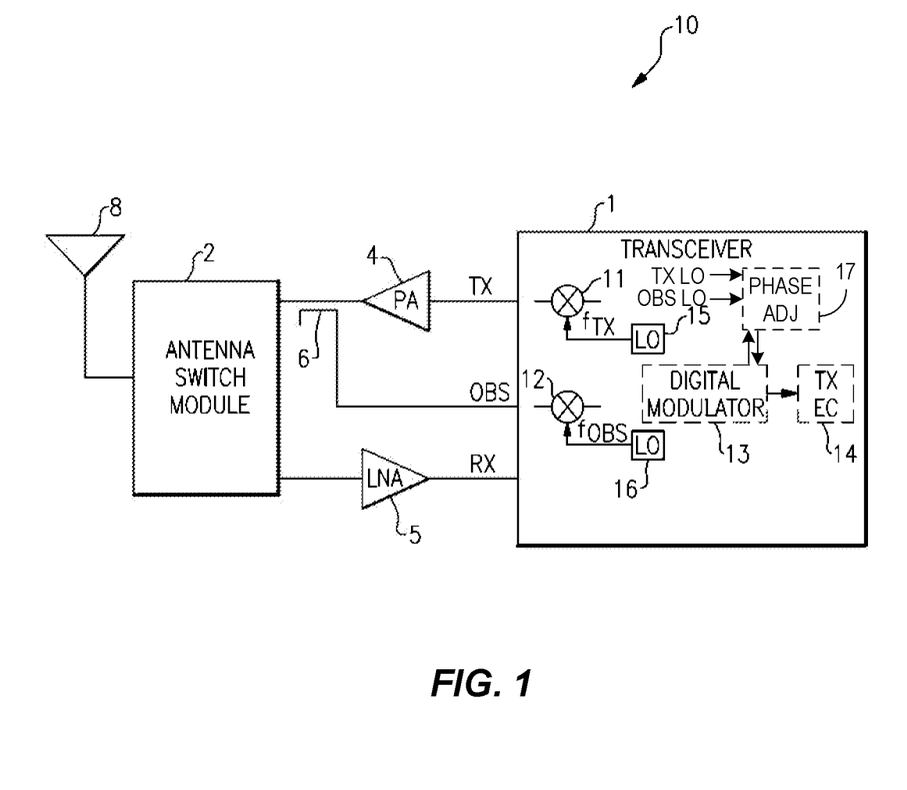
FIG. 1 is a schematic diagram of one embodiment of a radio frequency (RF) communication system.

FIG. 1 is a schematic diagram of one embodiment of an RF communication system 10. The RF communication system 10 includes a transceiver 1, an antenna switch module (ASM) 2, a power amplifier (PA) 4, a low noise amplifier (LNA) 5, a directional coupler 6, and an antenna 8.

As shown in FIG. 1, the transceiver 1 generates a transmit signal TX, which is provided to the PA 4 for amplification. An output of the PA 4 is electrically coupled to the antenna 8 via the antenna switch module 2. In the illustrated embodiment, the directional coupler 6 generates an observation signal OBS based on sensing the PA's output. However, other configurations are possible, including, for example, implementations in which an observation signal is generated based on an output of a driver stage, or implementations where the observations signal is generated based on a feedback path internal to the monolithic transceiver device. An input of the LNA 5 is electrically coupled to the antenna 8 via the antenna switch module 2. The LNA 5 generates a receive signal RX for the transceiver 1 based on providing low noise amplification to signals received on the antenna 8. Other configurations are also possible, including, for example, implementations in which an internal feedback path does not require an LNA.

Although the RF communication system 10 is illustrated as including one receive channel, one transmit channel, one observation channel, and one antenna, the teachings herein are also applicable to configurations using one or more additional receive channels, transmit channels, observation channels, and/or antennas. Moreover, the teachings herein are applicable to configurations in which the receive channel, transmit channel, and/or observation channel are implemented in other ways. For example, in another embodiment, an observation channel is implemented internally to a transmitter, such as by using an on-chip feedback path.

As shown in FIG. 1, the transceiver 1 includes a transmit mixer 11, which is used to generate the transmit signal TX based on providing modulation using a first or transmit local oscillator frequency $f_{TX}$ from a transmit local oscillator (LO) 15. Additionally, the transceiver 1 further includes an observation mixer 12, which is used to down-shift the frequency spectrum of the observation signal OBS based on providing modulation using a second or observation local oscillator frequency $f_{OBS}$ from an observation local oscillator (LO) 16.

The observation local oscillator frequency $f_{OBS}$ is offset from the transmit local oscillator frequency $f_{TX}$ such that transmit channel and observation channel operate with a frequency difference. By operating the transmit mixer 11 and the observation mixer 12 at different local oscillator frequencies, the observation channel can observe the transmit channel impairments substantially independently from the observation channel impairments.

In one embodiment, a frequency difference between the transmit local oscillator frequency $f_{TX}$ and the observation local oscillator frequency $f_{OBS}$ is selected to be at least about 100 KHz. However, other frequency differences are possible, such as a frequency difference selected based on application and/or implementation.

For example, a frequency difference can be selected based on the bandwidth of the transmit and observation channels. For instance, the frequency difference can be selected such that after an observation signal is down-shifted by the observation local oscillator frequency, the observed impairments are within the observation channel's bandwidth. As persons of ordinary skill in the art will appreciate, relative large frequency differences can decrease frequency spurs, but smaller frequency differences can have superior power and/or bandwidth performance. In certain implementations, the transmit local oscillator frequency $f_{TX}$ is selected to be greater than the observation local oscillator frequency $f_{OBS}$, while in other implementations the transmit local oscillator frequency $f_{TX}$ is selected to be less than the observation local oscillator frequency $f_{OBS}$.

Although the illustrated observation channel is described as being used for calibrating impairments of a transmit channel, the observation channel can also be used for additional functions. Additional observations can be performed using either offset local oscillator frequencies or the same local oscillator frequencies. Configuring an observation channel to perform multiple functions facilitates the sharing of hardware resources, thereby reducing cost, size, and/or complexity.

In one embodiment, the observation signal OBS and the receive signal RX are processed using a shared or common receive circuit of the transceiver 1. Configuring the transceiver 1 in this manner can reduce size and/or cost of the RF communication system 10.

The illustrated transceiver 1 also includes a digital modulator 13, which operates in a data path of the observation channel. In certain implementations, the digital modulator 13 is used to modulate a digital representation of the output of the observation mixer 12 after it is converted from the analog domain to the digital domain and/or further processed.

The digital modulator 13 is used to compensate for a frequency difference between the transmit local oscillator frequency $f_{TX}$ and the observation local oscillator frequency $f_{OBS}$. When the observation mixer and transmit mixer operate using different local oscillator frequencies, the observation impairments should remain symmetric in the observed signal, but the transmit impairments may no longer be symmetric. After digitally-compensating for the frequency difference using the digital modulator 13, the transmit channel impairments should be symmetric, while the observation channel impairments should be shifted such that they are asymmetric.

The illustrated transceiver 1 includes a transmit error correction circuit 14, which is used to process the output of the digital modulator 13 to detect and correct transmit impairments. In certain implementations, the transmit error correction circuit 14 detects transmit impairments based on correlating the observation channel's output for a length of time. In one embodiment, the transmit error correction circuit 14 detects transmit impairments by using a time-domain auto-correlation and cross-correlation circuit. The auto-correlate function correlates the complex (I/Q) transmit signal with itself. The cross-correlate function correlates the complex transmit signal against the complex observation signal. The correlations can be summed for a programmable number of cycles, and the results of accumulation can be used to solve a system of equations modelling the impairments.

The transmit error correction circuit 14 can be used to correct for a wide variety of transmit impairments, including, for example, quadrature errors, local oscillator leakage, and/or channel non-linearity.

In certain configurations, the transceiver 1 operates with digital predistortion (DPD) to aid in linearizing the PA 4 for different input power levels, and the observation channel performs DPD observations with an offset local oscillator frequency relative to the transmit channel. DPD can be used to compensate for nonlinear effects of the PA 4, including, for example, signal constellation distortion and/or signal spectrum spreading. A signal transmitted by the transceiver 1 can have an occupy bandwidth, and the transceiver 1 can transmit over a synthesis bandwidth that is greater than the occupy bandwidth. By configuring the transceiver 1 in this manner, the transceiver 1 can pre-distort the transmitted signal to compensate for out-of-band transmissions and other non-linear effects.

In one embodiment, the observation channel is used to perform observations over an observation bandwidth that is greater than both the synthesis bandwidth and occupy bandwidth. Additionally, to reduce the observation channel's power consumption and complexity, the observation channel is implemented with a bandwidth that is less than the full observation bandwidth. The frequency difference between the transmit local oscillator frequency and the observation local observation frequency changed over time to observe different portions of the observation bandwidth at different time instances. In such configurations, the transmit error correction circuit 14 can reconstruct the full observation bandwidth based on the observations performed for each local oscillator offset or frequency difference. Thus, the transceiver achieves the benefits of DPD using a low bandwidth observation channel having lower power consumption and/or reduced complexity.

The illustrated transceiver 1 also includes a phase adjustment circuit 17, which is used to generate a phase adjustment value for correcting for a phase difference between the transmit local oscillator 15 and the observation local oscillator 16 after frequency reprogramming. For example, during operation of the transceiver 1, the observation local oscillator 16 can be used for a wide variety of purposes, and thus the frequency of the observation local oscillator 16 can be changed over time. For instance, the observation local oscillator 16 can be programmed to observe transmit channel impairments, reprogrammed to observe adjacent spectrum, and then reprogrammed to again observe transmit channel impairments. After the observation local oscillator 16 is reprogrammed, the observation local oscillator 16 and the transmit local oscillator 15 can experience an arbitrary phase shift.

The illustrated phase adjustment circuit 17 generates the phase adjustment value, which is provided to the digital modulator 13 to restore the phase relationship between the observation local oscillator 16 and the transmit local oscillator 15 after arbitrary frequency reprogramming. The phase adjustment circuit 17 generates a beat signal based on the transmit local oscillator signal (TX LO) generated by the transmit local oscillator 15 and the observation local oscillator signal (OBS LO) generated by the observation local oscillator 16. In certain implementations, the phase adjustment circuit 17 generates the phase adjustment value based on low pass filtering the beat signal to generate a filtered beat signal, and digitally sampling the filtered beat signal to determine the phase relationship between the local oscillators.

In certain configurations, the phase adjustment circuit 17 can use the phase adjustment value to correct the phase of a phase accumulator of the digital modulator 13, thereby compensating the resulting samples generated by the observation channel for the phase shift between the local oscillators. As shown in FIG. 1, the phase adjustment circuit 17 can also be coupled to the digital modulator 13 to send and receive one or more values or signals from the digital modulator 13 to provide phase adjustment as disclosed herein. Although illustrated separately in FIG. 1, the phase adjustment circuit 17 may be part of the digital modulator 13 in some embodiments.

Additional details of the RF communication system 10 can be as described earlier.

Figure 2:
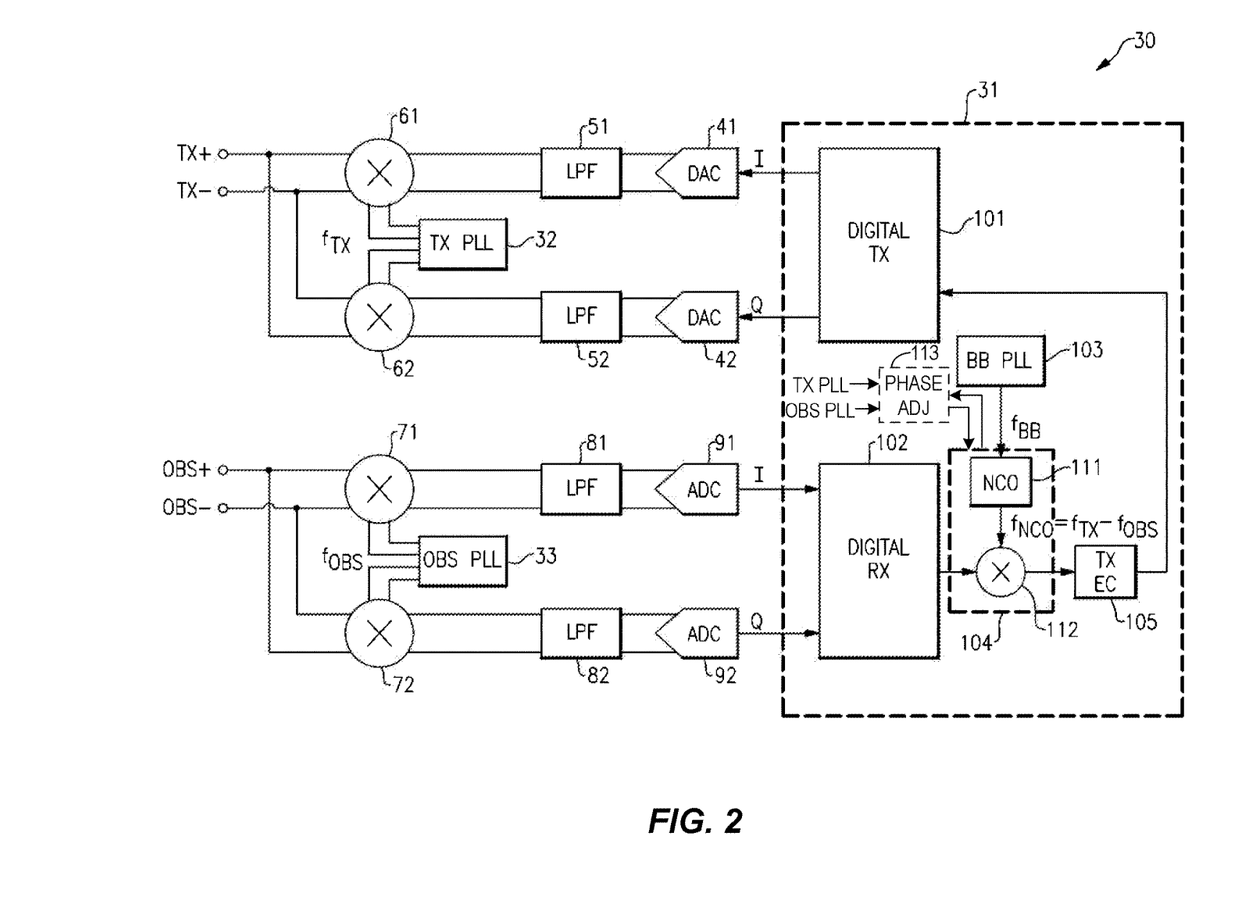
FIG. 2 is a schematic diagram of one embodiment of a transceiver.

FIG. 2 is a schematic diagram of one embodiment of a transceiver 30. The transceiver 30 includes a baseband processing circuit 31, a transmit phase-locked loop (PLL) 32, an observation PLL 33, a transmit in-phase digital-to-analog converter (DAC) 41, a transmit quadrature-phase DAC 42, a transmit in-phase low pass filter (LPF) 51, a transmit quadrature-phase LPF 52, a transmit in-phase mixer 61, a transmit quadrature-phase mixer 62, an observation in-phase mixer 71, an observation quadrature-phase mixer 72, an observation in-phase LPF 81, an observation quadrature-phase LPF 82, an observation in-phase analog-to-digital converter (ADC) 91, and an observation quadrature-phase ADC 92.

As shown in FIG. 2, the transceiver 30 generates a differential transmit signal TX+, TX− corresponding to a difference between a non-inverted transmit signal TX+ and an inverted transmit signal TX−. Additionally, the transceiver 30 receives a differential observation signal OBS+, OBS− corresponding to a difference between a non-inverted observation signal OBS+ and an inverted observation signal OBS−. The differential observation signal OBS+, OBS− is generated based on observing the transmit channel, such as by observing an output of a power amplifier that amplifies the differential transmit signal TX+, TX−. Although a configuration using differential signaling is shown, the teachings herein are also applicable to single-ended configurations and/or configurations using a combination of single-ended and differential signaling.

Although the transceiver 30 is illustrated as including one transmit channel or path and one observation channel or path, the transceiver 30 can also include additional circuitry, including, for example, one or more receive channels, one or more additional transmit channels, and/or one or more additional observation channels. Such details are omitted from FIG. 2 for clarity of the figures. Moreover, although the transceiver 30 illustrates a specific implementation of a transmit channel, observation channel, and baseband processing circuit, the teachings herein are applicable other configurations.

The transmit in-phase DAC 41 receives a digital transmit I signal from the baseband processing circuit 31, and generates a differential analog transmit I signal for the transmit in-phase LPF 51. The transmit in-phase LPF 51 filters the differential analog transmit I signal to generate a differential filtered transmit I signal, which is provided as an input to the transmit in-phase mixer 61. The transmit quadrature-phase DAC 42 receives a digital transmit Q signal from the baseband processing circuit 31, and generates a differential analog transmit Q signal for the transmit quadrature-phase LPF 52. The transmit quadrature-phase LPF 52 filters the differential analog transmit Q signal to generate a differential filtered transmit Q signal, which is provided as an input to the transmit quadrature-phase mixer 62. The non-inverted transmit signal TX+ is generated based on combining a first output of the transmit in-phase mixer 61 and a first output of the transmit quadrature-phase mixer 62, and the inverted transmit signal TX− is generated based on combining a second output of the transmit in-phase mixer 61 and a second output of the transmit quadrature-phase mixer 62.

The transmit PLL 32 generates a first differential transmit local oscillator signal for the transmit in-phase mixer 61 and a second differential transmit local oscillator signal for the transmit quadrature-phase mixer 62. The first and second differential transmit local oscillator signals each have a first or transmit local oscillator frequency $f_{TX}$, but a phase difference of about 90°.

The observation PLL 33 generates a first differential observation local oscillator signal for the observation in-phase mixer 71 and a second differential observation local oscillator signal for the observation quadrature-phase mixer 72. The first and second differential observation local oscillator signals each have a second or observation local oscillator frequency $f_{OBS}$, but a phase difference of about 90°. When observing the output of the transmit channel during calibration, the observation local oscillator frequency $f_{OBS}$ and the transmit local oscillator frequency $f_{TX}$ operate at different frequencies.

The observation in-phase mixer 71 receives the differential observation signal OBS+, OBS− and the first differential observation local oscillator signal, and generates a differential down-shifted I signal for the observation in-phase LPF 81. The observation in-phase LPF 81 filters the differential down-shifted I signal to generate a differential filtered observation I signal, which is provided as an input to the observation in-phase ADC 91. The observation in-phase ADC 91 converts the differential filtered observation I signal from the analog domain to the digital domain to generate a digital observation I signal for the baseband processing circuit 31. The observation quadrature-phase mixer 72 receives the differential observation signal OBS+, OBS− and the second differential observation local oscillator signal, and generates a differential down-shifted Q signal for the observation quadrature-phase LPF 82. The observation quadrature-phase LPF 82 filters the differential down-shifted Q signal to generate a differential filtered observation Q signal, which is provided as an input to the observation quadrature-phase ADC 92. The observation quadrature-phase ADC 92 converts the differential filtered observation Q signal from the analog domain to the digital domain to generate a digital observation Q signal for the baseband processing circuit 31.

In the illustrated embodiment, transmit and observation local oscillators have been implemented using the transmit PLL 32 and the observation PLL 33, respectively. Implementing the local oscillators of the transmit and observation channels using PLLs aids in generating local oscillator signals of different frequencies using a common reference clock signal. The PLLs can be implemented using similar circuit topologies, such that the observation local oscillator frequency $f_{OBS}$ has a well-controlled frequency difference relative to the transmit local oscillator frequency $f_{TX}$. For instance, the frequency difference between the observation local oscillator frequency $f_{OBS}$ and the transmit local oscillator frequency $f_{TX}$ can be controlled based on selecting values of digital control signals used to control feedback dividers of the PLLs.

As shown in FIG. 2, the baseband processing circuit 31 includes a digital transmit circuit 101, a digital receive circuit 102, a baseband PLL 103, a digital modulator 104, a phase adjustment circuit 113, and a transmit error correction circuit 105. In the illustrated embodiment, the digital modulator 104 includes a numerically controlled oscillator (NCO) 111 and a complex mixer 112.

The digital receive circuit 102 receives the digital observation I signal and the digital observation Q signal, and generates a digital input signal for the digital modulator 104. The digital modulator also receives a baseband clock signal having a baseband frequency $f_{BB}$ from the baseband PLL 103. In one embodiment, the digital receive circuit 102 is also used to process both observation signals used for observing a transmit channel and received signals received over a receive channel.

The NCO 111 receives the baseband clock signal and generates a digital output clock signal having an NCO frequency $f_{NCO}$ that is about equal to a frequency difference between the transmit local oscillator frequency $f_{TX}$ and the observation local oscillator frequency $f_{OBS}$. The digital output clock signal can be implemented in a wide variety of ways. In certain configurations, the digital output clock signal includes a first component corresponding to a digital representation of a sine function of frequency $f_{NCO}$ and a second component corresponding to a digital representation of a cosine function of frequency $f_{NCO}$. The digital output clock signal can have a wide variety of bit widths. In one embodiment, the NCO 111 is implemented using a phase accumulator and a phase-to-amplitude converter.

The digital complex mixer 112 generates a digital observation channel output signal for the transmit error correction circuit 105 based on modulating the digital input signal from the digital receive circuit 102 with the digital output clock signal from the NCO 111. In certain implementations, the digital complex mixer 112 receives a digital input I signal and a digital input Q signal from the digital receive circuit 102, and generates a digital observation channel output I signal and a digital observation output Q signal for the transmit error correction circuit 105.

In one embodiment, the baseband PLL 103, the transmit PLL 32, and the observation PLL 33 operate using a common reference clock signal. Configuring the transceiver 30 in this manner can aid in matching the NCO frequency $f_{NCO}$ to the frequency difference between the transmit local oscillator frequency $f_{TX}$ and the observation local oscillator frequency $f_{OBS}$.

The transmit error correction circuit 105 processes the observational channel output signal to generate one or more correction signals for the transceiver 30. In the illustrated embodiment, the transmit error correction circuit 105 provides a correction signal to the digital transmit circuit 101. However, a transmit error correction circuit can be configured to compensate for transmit impairments in other ways. The digital transmit circuit 101 generates the digital transmit I signal and the digital transmit Q signal based on the correction signal to compensate for transmit impairments, such as leakage, quadrature errors, and/or channel non-linearity.

The illustrated transceiver 30 can provide transmit channel calibration without needed to calibrate the observation channel beforehand for quadrature error. In particular, by performing observations using a different observation local oscillator frequency $f_{OBS}$ relative to the transmit local oscillator frequency $f_{TX}$, the transmit error correction circuit 105 can detect and correct transmit impairments, even in the presence of impairments in the observation channel. For example, the digital observation channel output signal generated by the digital modulator 104 can have a frequency spectrum in which transmit channel impairments are symmetric, and in which observation channel impairments are asymmetric. Thus, the transmit error correction circuit 105 can correlate the digital observation channel output signal to detect transmit impairments, while the observation channel impairments should tend to be non-correlated and average as noise.

In contrast, a transceiver that performs observation using a common transmit and observation local oscillator frequencies, may not be able to differentiate between impairments of the transmit channel and impairments of the observation channel. For example, when using the same local oscillator frequency, both transmit local oscillator leakage and observation local oscillator leakage can have similar characteristics in the frequency domain.

In the illustrated embodiment, the NCO 111 is programmed to generate a digital output clock signal having an NCO frequency $f_{NCO}$ that is about equal to a difference between the transmit local oscillator frequency $f_{TX}$ and the observation local oscillator frequency $f_{OBS}$. When the NCO 111 generates the digital output clock signal in this manner, the transmit error correction circuit 105 can perform a correlation to detect transmit impairments over a wide range of time periods, including, for example, a relatively long time period to provide a low noise floor. In contrast, when the NCO frequency $f_{NCO}$ does not match the frequency difference, a phase relationship between positive and negative frequency components of a given impairment can slowly rotate, and long correlations can tend to average to zero rather than accumulate.

In some implementations, the observation local oscillator such as the observation PLL 33 can be reprogrammed for another purpose, for example, to observe an adjacent spectrum to the signal transmitted by the transceiver 31. When the observation PLL 33 is switched back to observe the transmit channel, the observation PLL 33 can relock to the previous observation frequency $f_{OBS}$, but the phase relationship of the observation local oscillator signal can be different depending on the timing of the repurposing and restoration of the observation PLL 33. As a result, the phase relationship between the transmit local oscillator (e.g., the transmit PLL 32) and the observation local oscillator (e.g., the observation PLL 33) that was used prior to the reprogramming can no longer be used, and a time consuming reacquisition process may be needed. As disclosed herein, it can be advantageous to restore from a changed phase relationship to a known phase relationship between the transmit and observation oscillators. As discussed below, the phase adjustment circuit 113 (which can be part of the digital modulator 104) can be used to adjust the phase in the digital modulator 104 to achieve a desired phase relationship between the local oscillators.

In the illustrated embodiment, the phase adjustment circuit 113 receives a first or transmit oscillator signal having the first or transmit local oscillator frequency $f_{TX}$ from the transmit PLL 32 and a second or observation oscillator signal having the second or observation local oscillator frequency $f_{OBS}$ from the observation PLL 33. The illustrated embodiments includes the transmit PLL 32 and the observation PLL 33 generating differential signals for in-phase and quadrature-phase paths respectively, and the phase adjustment circuit 113 can be configured to receive one or more of the local oscillator signals from the transmit PLL 32 and one or more of the local oscillator signals from the observation PLL 33.

Although FIG. 2 illustrates an embodiment in which the clock signals generated by the transmit PLL 32 and the observation PLL 33 are differential, the teachings herein are also applicable to configurations in which a local oscillator generates single-ended clock signals. In such embodiments, the phase adjustment circuit 113 may receive at least one local oscillator signal from a single ended local oscillator. As further discussed below in connection with FIGS. 3-4, the phase adjustment circuit 113 can be coupled to the NCO 111 to receive one or more values or signals indicating accumulated phase, and based on the first and second oscillator signals and the values from the NCO 111, the phase adjustment circuit 113 can generate a phase adjustment value to be used in the digital modulator 104.

The phase adjustment circuit 113 generates a beat signal based on the transmit local oscillator signal (TX OBS) and the observation local oscillator signal (OBS PLL). The phase adjustment circuit 113 uses the beat signal to generate the phase adjustment value for compensating for the phase shift between the local oscillators. For example, the adjustment circuit 113 can use the phase adjustment value to correct a state of a phase accumulator of the NCO 111, thereby compensating the resulting samples generated by the observation channel for the phase shift. After the adjustment to the phase accumulator's phase, the resulting output signal of the observation channel exhibits a substantially fixed relationship to the phase of the transmit data, thereby achieving phase synchronization.

Additional details of the transceiver 30 can be as described earlier.

Figure 3:
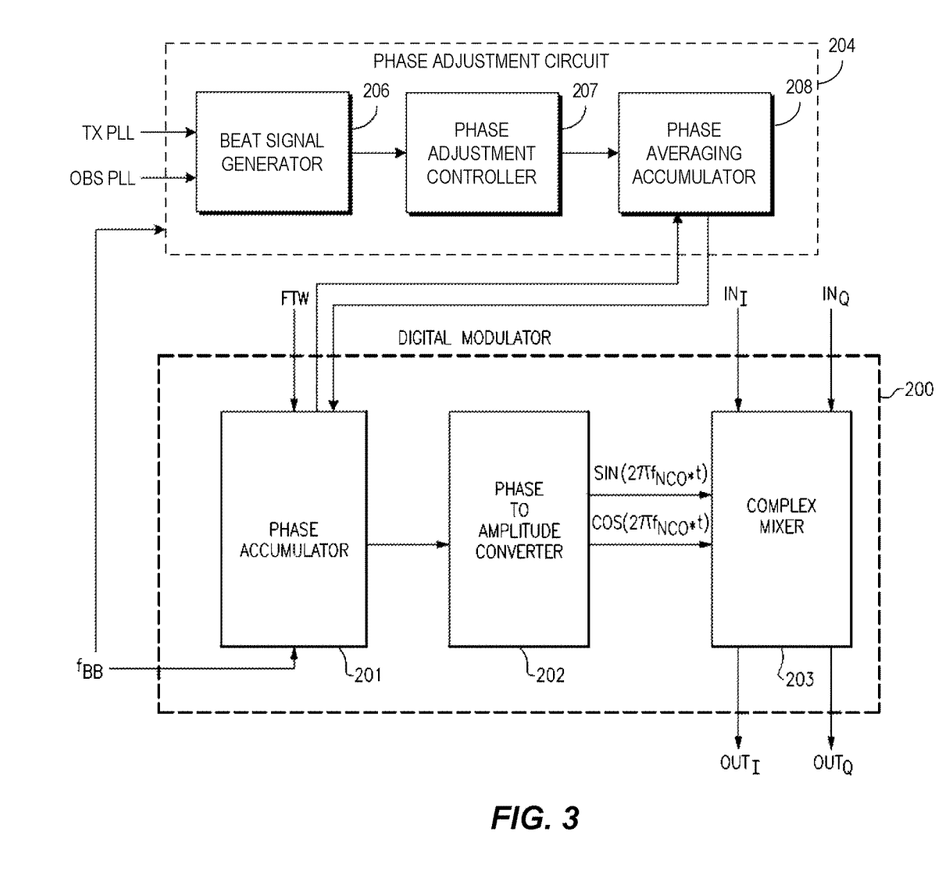
FIG. 3 is a schematic diagram of one embodiment of phase adjustment generator and one embodiment of a digital modulator.

FIG. 3 is a schematic diagram of one embodiment of a phase adjustment circuit 204 and one embodiment of a digital modulator 200. The digital modulator 200 includes a phase accumulator 201, a phase-to-amplitude converter (PAC) 202, and a digital complex mixer 203. The digital modulator 200 receives a baseband clock signal of frequency $f_{BB}$, a frequency tuning word (FTW), a digital input I signal $IN_I$, and a digital input Q signal $IN_Q$. The digital modulator 200 generates a digital observation channel output I signal $OUT_I$ and a digital observation channel output Q signal $OUT_Q$, which can be provided to a transmit error correction circuit for processing.

The phase adjustment circuit 204 includes a beat signal generator 206, a phase adjustment controller 207, and a phase averaging accumulator 208. In the illustrated embodiment, at least a portion of the phase adjustment circuit 204 operates at the baseband frequency $f_{BB}$. The beat signal generator 206 receives a first or transmit oscillator signal having the transmit local oscillator frequency $f_{TX}$ from a transmit LO or PLL and a second or observation oscillator signal having the observation local oscillator frequency $f_{OBS}$ from a second or observation LO or PLL. The phase adjustment controller 207 receives a beat signal generated by the beat signal generator 206, and generates one or more phase adjustment control signals to control the timing and amount of phase adjustment as disclosed herein. As discussed below in connection with FIG. 4, the phase adjustment circuit 204 may include further components or elements in implementing phase adjustments.

The digital modulator 200 illustrates one embodiment of a digital modulator that can be used in the RF communication systems and transceivers described herein. Also, the phase adjustment circuit 204 illustrates one embodiment of a phase adjuster that can be used in the RF communication systems and transceivers described herein. However, the teachings herein are applicable to other configurations of digital modulators and phase adjusters.

The illustrated phase accumulator 201 and PAC 202 collectively operate as an NCO that generates digital sine and cosine clock signals of an NCO frequency $f_{NCO}$. Additionally, a value of the FTW is used to control the NCO frequency $f_{NCO}$.

For example, the phase accumulator 201 includes state elements, such as latches and/or flip-flops, used to store an accumulated phase value. Additionally, the phase accumulator 201 can add the FTW to the accumulated phase value based on timing of the baseband clock signal. Additionally, the PAC 202 generates the digital sine and cosine clock signals based on the accumulated phase value. The FTW controls the rate at which phase is accumulated, and thus the NCO frequency $f_{NCO}$.

Additional details of the digital modulator 200 can be as described earlier.

Figure 4:
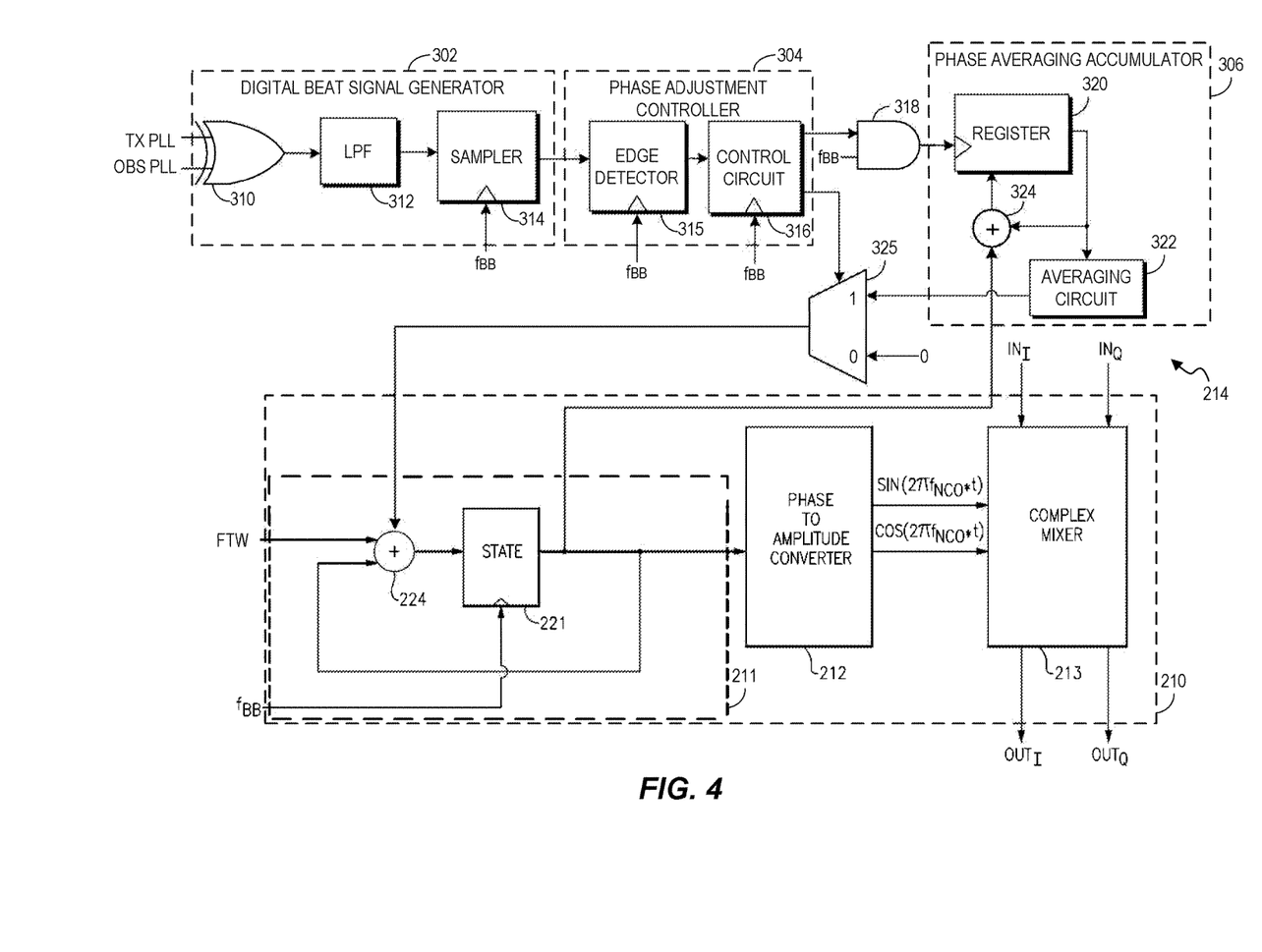
FIG. 4 is a schematic diagram of another embodiment of phase adjustment generator and another embodiment of a digital modulator.

FIG. 4 is a schematic diagram of another embodiment of a phase adjustment circuit 214 and another embodiment of a digital modulator 210. The illustrated phase adjustment circuit 214 includes a beat signal generator 302, a phase adjustment controller 304, a phase averaging accumulator 306. The illustrated digital modulator 210 includes a phase accumulator 211, a PAC 212, and a digital complex mixer 213. The illustrated embodiment of the phase adjustment circuit 214 further includes one or more control logic circuits, including but not limited to an AND gate 318 and a multiplexer 325. The digital modulator 210 receives a phase adjustment value, the baseband clock signal, the FTW, the digital input I signal $IN_I$, and the digital input Q signal $IN_Q$. Additionally, the digital modulator 210 generates the digital observation channel output I signal $OUT_I$ and the digital observation channel output Q signal $OUT_Q$.

The illustrated phase accumulator 211 includes state elements 221 and an adder 224. The state elements 221 are used to store an accumulated phase value, which is updated based on timing of the baseband clock signal. The adder 224 generates an adjusted accumulated phase value based on adding the accumulated phase value stored in the state elements 221 and a tuning word, such as FTW. The adjusted accumulated phase value is loaded into the state elements 221 based on timing of the baseband clock signal, such as once per clock cycle. In some embodiments, one or more values such as FTW within the digital modulator 211 can be otherwise further adjusted, for example, to take account matching of the exact modulus of the transmit PLL and observation PLL when phase wrapping.

As described earlier, a transmit channel can be calibrated based on observing a transmit channel using an observation channel that operates with an observation local oscillator frequency $f_{OBS}$ that is different than a transmit local oscillator frequency $f_{TX}$. The illustrated digital modulator 211 can be used to compensate for this frequency difference by controlling the NCO frequency $f_{NCO}$ to be about or equal to $f_{TX}-f_{OBS}$.

In the illustrated embodiment, the phase adjustment controller 304 includes an edge detector 315 and a control circuit 316. The edge detector 315 receives the beat signal from the beat signal generator 302, and detects edges or transitions of the beat signal. The edge detector 315 is clocked at the baseband frequency $f_{BB}$ and can be configured to detect rising edges, falling edges, or both rising and falling edges, which can be accounted for in the control circuit 316 following the edge detector 315 in generating control signals. The control circuit 315 receives the edge detection outputs from the edge detector 315 to generate one or more control signals.

In the illustrated embodiment, the beat signal generator 302 includes an XOR gate 310, an LPF 312, and a sampler 314. In other embodiments, a beat signal generator can be implemented with an analog mixer (not shown) instead. However, using the XOR gate 310 can provide a number of advantages. For example, the transmit and observation local oscillator signals can have waveforms resembling square waves and have significant high frequency harmonic content, and thus can be suitable for processing using the XOR gate 310. Moreover, using the XOR gate 310 can reduce power consumption and/or complexity relative to a configuration using an analog mixer.

In certain implementations, the transmit local oscillator signal and the observation local oscillator signal can be represented as Equations 1 and 2 below:

$$LO_{TX}=A_{TX}\sin(2\pi f_{TX}t+\phi_{TX}) \quad \text{Equation 1}$$

$$LO_{OBS}=A_{OBS}\sin(2\pi f_{OBS}t+\phi_{OBS}) \quad \text{Equation 2}$$

where $A_{TX}$ and $A_{OBS}$ are respective amplitudes of the transmit and observation local oscillator signals, $f_{TX}$ and $f_{OBS}$ are respective frequencies of the transmit and observation local oscillator signals, and $\phi_{TX}$ and $\phi_{OBS}$ are respective phases of the transmit and observation local oscillator signals.

As the beat signal generator 302 receives and mixes the transmit local oscillator and observation local oscillator signals with the XOR gate 310 or an analog mixer (not shown), the resulting signal from the XOR gate 310 or an analog mixer can be given by Equation 3 below:

$$LO_{TX} \cdot LO_{OBS} = \frac{A_{TX}A_{OBS}}{2}[\cos(2\pi(f_{TX}-f_{OBS})t+\varphi_{TX}-\varphi_{OBS})-\cos(2\pi(f_{TX}+f_{OBS})t+\varphi_{TX}-\varphi_{OBS})] \quad \text{Equation 3}$$

In situations where $f_{TX}$ and $f_{OBS}$ are relatively large compared to the difference between them, the signal resulting from the XOR gate 310 or mixer circuit will contain low frequency components at the frequency of the difference between $f_{TX}$ and $f_{OBS}$, and higher frequency components at the sum of the frequencies. Therefore, the output of the XOR gate 310 or an analog mixer can be processed by the LPF 312 to filter out high frequency harmonic content, and the resulting signal outputted from the LPF 312 can be given by Equation 4 below:

$$LPF(LO_{TX} \cdot LO_{OBS}) = \frac{A_{TX}A_{OBS}}{2}\cos(2\pi(f_{TX}-f_{OBS})t + \varphi_{TX}-\varphi_{OBS}) \quad \text{Equation 4}$$

For certain implementations, the transmit LO and observation LO will not be sinusoidal as described in Equations 3 and 4, but instead might contain higher frequency harmonics, for example, of the LO's approximated square waves. Equations 3 and 4, although simplified to describe the sinusoidal case, still apply similarly to higher frequency harmonics and the following low pass filtering will yield the equivalent resulting signal.

The output from the LPF 312 can then be sampled or quantized by the sampler 314 run at the baseband frequency $f_{BB}$. The resulting signal from the sampler 314 is a beat signal having a beat frequency of $(f_{TX}-f_{OBS})$ and a phase of $(\phi_{TX}-\phi_{OBS})$. To sample the output of the LPF 312 without aliasing, the baseband frequency $f_{BB}$ can be at least twice as the frequency of the beat signal, if not much higher for better and faster performance.

Also, in the illustrated embodiment, the phase averaging accumulator 306 includes a register 320, an adder, 324, and an averaging circuit 322. In certain implementations with a rising edge detector as the edge detector 315, when a rising edge is detected by the edge detector 315 and the control circuit 316 accordingly signals a phase averaging to occur, the register 320 and the adder 324 can add and store the accumulated phase value from the phase accumulator 211. The averaging circuit 322, then, can take average of a certain number of phases accumulated when an edge of the beat signal is detected. In some configurations, the averaging circuit 322 can be implemented with one or more shift registers and the number of phase to be averaged can be $2^N$ where N is a positive integer. Using shift registers provides computationally efficient phase averaging. In other implementations, the falling edges from the edge detector may be used instead of the rising edges to accomplish similar computation.

In the illustrated embodiment, the control circuit 316 can output a signal to the AND gate 318, whose output controls timing of phase averaging the phase averaging accumulator 306. Also, the control circuit 316 in the illustrate embodiment, can generate a control signal of the multiplexer 325 for controlling when the averaged accumulated phase generated from the phase averaging accumulator 306 can be applied to the digital modulator 211 to adjust the phase. The control logic implemented in the control circuit 316 can additionally provide an interface to the user for selecting when to perform phase synchronization calibrations. In one embodiment, the control circuit 316 is implemented as peripheral digital logic to a microprocessor. The control logic can be provided to a standard processor bus allowing the processor to control when phase synchronization were started by sending commands to registers contained within the control circuit 316. The control logic implemented in the control circuit 316 may additionally contain various registers which allow specification of various parameters of the phase synchronization disclosed herein. In one embodiment, registers exist in the control circuit 316 for specifying how many samples of the beat signal are averaged before a phase adjustment is performed.

In other embodiments, at least some of the operations of the adjustment circuit 214, such as the averaging done by the phase averaging accumulator 306, can be concurrently run with data gathering for transmit calibrations. In such embodiments, the register 320 can be run at the baseband frequency $f_{BB}$ instead of the output of the AND gate 318 to perform averaging concurrently with data gathering, not only when an edge of the beat signal is detected. In certain implementations where the transmit calibration data is maintained in I/Q format after gathering, the observed phase averaging performed by the currently run phase averaging accumulator can be used to perform additional calibrations, such as providing phase rotation to the transmit calibration data prior to additional processes and computations.

In such embodiments, the phase adjustment value generated by the phase averaging accumulator can be used to adjust phase of accumulated observation data including direct current (DC) accumulation, auto correlation, and cross correlation. It can be advantageous to implement a phase adjustment circuit as disclosed herein because the calibrations can be performed faster as it allows data gathering for transmit calibrations need not wait until the phase adjustment is complete.

Although one example of equations for an RF communication and digital modulator have been provided, other equations are possible. For example, the equations can vary with application and/or implementation.

Additional details of the digital modulator 210 and the phase adjustment circuit 214 can be as described earlier.

Aspects of this disclosure can be implemented in various electronic devices. Examples of the electronic devices can include, but are not limited to, consumer electronic products, parts of the consumer electronic products, electronic test equipment, vehicular electronics systems, etc. Examples of the electronic devices can include, but are not limited to, computing devices, communications devices, electronic household appliances, automotive electronics systems, etc. Further, the electronic devices can include unfinished products.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." Additionally, the words "herein," "above," "below," and words of similar import, when used in this application, shall refer to this application as a whole and not to any particular portions of this application. Where the context permits, words in the above Detailed Description of Certain Embodiments using the singular or plural number may also include the plural or singular number respectively. Where the context permits, the word "or" in reference to a list of two or more items is intended to cover all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the Figures depict example arrangements of elements and components, additional intervening elements, devices, features, or components may be present in an actual embodiment (assuming that the functionality of the depicted circuits is not adversely affected).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more operations or actions for achieving the described method. The method steps and/or actions may be interchanged with one another without departing from the scope of the claims. In other words, unless a specific order of operations or actions is specified, the order and/or use of specific operations and/or actions may be modified without departing from the scope of the claims.

It is to be understood that the implementations are not limited to the precise configuration and components illustrated above. Various modifications, changes and variations may be made in the arrangement, operation and details of the methods and apparatus described above without departing from the scope of the implementations.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well.

What is claimed is:

1. A method of transceiver calibration comprising:
   generating a transmit local oscillator signal of a first frequency;
   generating an observation local oscillator signal of a second frequency different from the first frequency;
   generating a beat signal based on the transmit local oscillator signal and the observation local oscillator signal;
   generating a phase adjustment value based on the beat signal; and
   adjusting a digital modulator based on the phase adjustment value to achieve a desired phase relationship between the transmit local oscillator signal and the observation local oscillator signal.

2. The method of claim 1, wherein generating the phase adjustment value further comprises:
   low-pass filtering the beat signal using a low-pass filter; and
   generating the phase adjustment value based on sampling the low-pass filtered beat signal using a sampling circuit.

3. The method of claim 2, wherein the sampling using the sampling circuit is done at a baseband frequency that is at least twice a frequency of the beat signal.

4. The method of claim 1, wherein generating the phase adjustment signal comprises:
   detecting a plurality edges of the beat signal to generate a phase adjustment control value; and
   averaging a plurality of phase accumulator values based on the phase adjustment control signal to generate the phase adjustment value.

5. The method of claim 4, wherein averaging the plurality of phase accumulator values comprises averaging $2^N$ phase accumulator values using shifting, wherein N is a positive integer.

6. The method of claim 1, wherein mixing the first local oscillator signal and the second local oscillator signal is performed with a digital exclusive-OR (XOR) gate.

7. The method of claim 1, further comprising compensating for a frequency difference between the transmit local oscillator signal and the observation local oscillator signal using the digital modulator.

8. The method of claim 1, further comprising:
   mixing a transmit signal and the transmit local oscillator signal using a transmit mixer of a transmit channel;
   generating an observation signal from the transmit channel;
   mixing the observation signal and the observation local oscillator signal using an observation mixer of an observation channel; and
   adjusting a phase of accumulated observation data from the observation channel based on the phase adjustment value.

9. The method of claim 8, wherein the accumulated observation data are collected simultaneously as the phase adjustment value is generated.

10. The method of claim 8, wherein adjusting the phase of the accumulated observation data comprises compensating for phase shift in at least one of:
   direct current (DC) accumulation;
   auto-correlation; or
   cross-correlation.

11. A transceiver comprising:
   a transmit channel comprising a transmit local oscillator configured to generate a transmit local oscillator signal of a first frequency;
   an observation channel comprising an observation local oscillator configured to generate an observation local oscillator signal of a second frequency different from the first frequency; and
   a phase adjustment circuit configured to generate a beat signal based on the transmit local oscillator signal and the observation local oscillator signal, wherein the phase adjustment circuit is further configured to generate a phase adjustment value based on the beat signal, wherein the phase adjustment circuit is further configured to adjust a phase of accumulated observation data from the observation channel based on the phase adjustment value to achieve a desired phase relationship between the transmit local oscillator signal and the observation local oscillator signal.

12. The transceiver of claim 11, wherein the transmit channel further comprises a transmit mixer configured to mix the transmit local oscillator signal and a transmit signal, wherein the observation channel is further configured to mix the observation local oscillator signal and an observation signal generated from the transmit channel.

13. The transceiver of claim 11, wherein the phase adjustment circuit comprises a low-pass filter and a sampling circuit, and is configured to generate the phase adjustment value based on low-pass filtering the beat signal to generate a filtered beat signal using the low-pass filter, and digitally sampling the filtered beat signal using the sampling circuit.

14. The transceiver of claim 11 further comprising a digital modulator is configured to compensate for a frequency difference between the transmit local oscillator signal and the observation local oscillator signal, wherein the digital modulator is adjusted based on the phase adjustment value.

15. The transceiver of claim 11, wherein the phase of the accumulated observation data is adjusted to compensate for phase shift in at least one of:
   direct current (DC) accumulation;
   auto-correlation; or
   cross-correlation.

16. The transceiver of claim 11, wherein the phase adjustment circuit comprises:
   a beat signal generator configured to generate the beat signal having a frequency and a phase based respectively on a frequency difference and a phase difference between the transmit local oscillator signal and the observation local oscillator;
   an edge detector configured to detect a plurality of edges of the beat signal to generate a phase adjustment control signal; and
   a phase averaging accumulator configured to average a plurality of phase accumulator values based on the phase adjustment control signal to generate the phase adjustment value.

17. The transceiver of claim 16, wherein the beat signal generator comprises a digital exclusive-OR (XOR) gate including a first input that receives the transmit local oscillator signal and a second input that receives the observation local oscillator signal.

18. The transceiver of claim 17, wherein the beat signal generator further comprises a low-pass filter including an input electrically connected to an output of the XOR gate, and a sampler including an input electrically connected to an output of the low-pass filter.

19. The transceiver of claim 18, wherein the sampler is run at a baseband frequency that is at least twice a frequency of the beat signal.

20. The transceiver of claim 16, wherein the phase averaging accumulator comprises a shift register configured to average $2^N$ phase accumulator values where N is a positive integer.

21. A method of transceiver calibration comprising:
   generating a transmit local oscillator signal of a first frequency for a transmit channel;
   generating an observation local oscillator signal of a second frequency different from the first frequency for an observation channel;
   generating a beat signal based on the transmit local oscillator signal and the observation local oscillator signal;
   generating a phase adjustment value based on the beat signal; and
   adjusting a phase of accumulated observation data from the observation channel based on the phase adjustment value to achieve a desired phase relationship between the transmit local oscillator signal and the observation local oscillator signal.

* * * * *